United States Patent
Bloch et al.

(10) Patent No.: US 10,046,471 B1
(45) Date of Patent: Aug. 14, 2018

(54) VACUUM TABLE WITH INDIVIDUAL VACUUM CHAMBERS

(71) Applicant: The Boeing Company, Chicago, IL (US)

(72) Inventors: Daniel David Bloch, St. Peters, MO (US); Camille Doristine Carter, St. Louis, MO (US); Nicole Renee Williams, O'Fallon, MO (US); Samuel J. Easley, St. Peters, MO (US); Eric E. Moyes, Belleville, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/477,884

(22) Filed: Apr. 3, 2017

(51) Int. Cl.
*B25B 11/00* (2006.01)
*B26D 7/01* (2006.01)
*B23Q 3/08* (2006.01)

(52) U.S. Cl.
CPC ............ *B26D 7/018* (2013.01); *B23Q 3/088* (2013.01)

(58) Field of Classification Search
CPC ........ B25B 11/00; B25B 11/005; B25B 11/02
See application file for complete search history.

(56) References Cited

U.S. PATENT DOCUMENTS

| | | | | |
|---|---|---|---|---|
| 5,899,445 A | * | 5/1999 | Kimble | B25B 5/06 269/21 |
| 6,257,564 B1 | * | 7/2001 | Avneri | B25B 11/005 269/21 |
| 6,817,933 B2 | * | 11/2004 | Blick | B24B 41/068 269/21 |
| 7,607,647 B2 | * | 10/2009 | Zhao | B25B 11/005 269/20 |
| 2008/0229811 A1 | * | 9/2008 | Zhao | B25B 11/005 73/104 |
| 2010/0123277 A1 | * | 5/2010 | Wang | B25B 11/007 269/21 |
| 2010/0133735 A1 | * | 6/2010 | Katsuta | B23Q 3/088 269/21 |
| 2012/0311848 A1 | * | 12/2012 | Park | H01L 21/6838 29/559 |
| 2016/0039140 A1 | | 2/2016 | Bloch et al. | |
| 2016/0111318 A1 | * | 4/2016 | Ichinose | H01L 21/6838 430/322 |

* cited by examiner

*Primary Examiner* — Lee D Wilson
(74) *Attorney, Agent, or Firm* — Duft Bornsen & Fettig LLP

(57) ABSTRACT

A vacuum table for securing a sheet of material. The vacuum table includes a top plate that is porous, a perimeter vacuum chamber disposed beneath a perimeter of the top plate, and interior vacuum chambers bound by the perimeter vacuum chamber and disposed beneath a target area of the top plate that is inside the perimeter of the top plate.

19 Claims, 12 Drawing Sheets

VACUUM TABLE WITH INDIVIDUAL VACUUM CHAMBERS

FIELD

This disclosure relates to the field of vacuum tables that secure workpieces during machining.

BACKGROUND

Vacuum tables are devices that use suction to securely hold workpieces during machining, such as cutting (e.g., with a router or drag knife), milling, engraving, etc. A typical vacuum table includes a porous or perforated table top connected to a vacuum chamber. A vacuum pump continuously applies suction to the vacuum chamber so that a workpiece is held against the table top. When processing (e.g., cutting) of the workpiece is complete, the vacuum pump may be shut off so that the workpiece can be removed from the table top. Because of the advantages of using vacuum tables during manufacturing processes, it is desirable to design improved vacuum tables.

SUMMARY

Embodiments described herein provide for a vacuum table that is segmented into individual vacuum chambers. As described above, a vacuum table produces suction so that a workpiece is pulled against its top surface. The individual vacuum chambers of the vacuum table described herein each correspond with a different location of the top surface. The individual vacuum chambers may be selectively controlled to provide a vacuum pressure at different locations on the top surface. Thus, vacuum may be applied at some locations on the top surface of the vacuum table, and removed from other locations. This is advantageous in machining processes. For example, when a part is being cut from a sheet of material on the vacuum table, vacuum can be selectively applied to the location of the part as it is cut, and vacuum can be removed from that location after the cut so that the part can be removed from the vacuum table. At the same time, vacuum may be applied at other locations on the vacuum table so that the sheet of material remains registered on the vacuum table. The vacuum table as described herein gives operators flexibility in how and where a sheet of a material is machined.

One embodiment comprises an apparatus that includes a vacuum table. The vacuum table includes a top plate that is porous, a perimeter vacuum chamber disposed beneath a perimeter of the top plate, and interior vacuum chambers bound by the perimeter vacuum chamber and disposed beneath a target area of the top plate that is inside the perimeter of the top plate.

In another embodiment, the vacuum table further includes at least one first vacuum port that couples to the perimeter vacuum chamber, and a plurality of second vacuum ports. At least one of the second vacuum ports is coupled to a corresponding one of the interior vacuum chambers.

In another embodiment, the apparatus further includes a first vacuum pump coupled to the at least one first vacuum port, and a controller configured to control the first vacuum pump to apply a constant vacuum to the perimeter vacuum chamber.

In another embodiment, the apparatus further includes second vacuum pumps each coupled to a corresponding one of the second vacuum ports. The controller is configured to selectively control the second vacuum pumps to apply a vacuum to the interior vacuum chambers individually.

In another embodiment, one of the second vacuum ports includes an elongated vacuum channel, and a plurality of openings that extend between the elongated vacuum channel and an interior vacuum chamber. The openings are spaced along a wall of the interior vacuum chamber.

In another embodiment, the one of the second vacuum ports includes an air valve that controls air flow through the plurality of openings. The air valve includes a flap and at least one spring. When the air valve is closed, the at least one spring exerts a force against the flap to cover the plurality of openings. To open the air valve, a vacuum applied to the one of the second vacuum ports overcomes the force exerted by the at least one spring to move the flap away from the plurality of openings.

In another embodiment, the one of the second vacuum ports includes an actuated valve that controls air flow through the plurality of openings. The actuated valve includes a slide mechanism that includes apertures. When the slide mechanism is moved into a first position, the slide mechanism covers the plurality of openings. When the slide mechanism is moved into a second position, the apertures of the slide mechanism align with the plurality of openings to allow air to flow through the plurality of openings.

In another embodiment, the apertures in the slide mechanism are different sizes.

In another embodiment, the apparatus further includes a feed roll that attaches toward a first end of the vacuum table, and a take-up roll that attaches toward a second opposing end of the vacuum table.

In another embodiment, the feed roll is configured to store a web of material, and the web of material is strung between the feed roll and the take-up roll, and is routed over the vacuum table.

Another embodiment comprises an apparatus that includes a vacuum table. The vacuum table includes a top plate that is porous, and a vacuum box that connects with the top plate. The vacuum box is segmented to individual vacuum chambers that comprise a perimeter vacuum chamber disposed beneath a perimeter of the top plate, and interior vacuum chambers bound by the perimeter vacuum chamber and disposed beneath a central area of the top plate.

In another embodiment, the vacuum table further includes at least one first vacuum port that couples to the perimeter vacuum chamber, and a plurality of second vacuum ports. At least one of the second vacuum ports is coupled to a corresponding one of the interior vacuum chambers.

In another embodiment, the apparatus further includes a first vacuum pump coupled to the at least one first vacuum port, and a controller configured to control the first vacuum pump to apply a constant vacuum to the perimeter vacuum chamber.

In another embodiment, the apparatus further includes second vacuum pumps each coupled to a corresponding one of the second vacuum ports. The controller is configured to selectively control the second vacuum pumps to apply a vacuum to the interior vacuum chambers individually.

In another embodiment, one of the second vacuum ports includes an elongated vacuum channel, and a plurality of openings that extend between the elongated vacuum channel and an interior vacuum chamber. The openings are spaced along a wall of the interior vacuum chamber.

In another embodiment, the one of the second vacuum ports includes an air valve that controls air flow through the plurality of openings. The air valve includes a flap and at least one spring. When the air valve is closed, the at least one spring exerts a force against the flap to cover the plurality of openings. To open the air valve, a vacuum applied to the one of the second vacuum ports overcomes the force exerted by the at least one spring to move the flap away from the plurality of openings.

In another embodiment, the one of the second vacuum ports includes an actuated valve that controls air flow through the plurality of openings. The actuated valve includes a slide mechanism that includes apertures. When the slide mechanism is moved into a first position, the slide mechanism covers the plurality of openings. When the slide mechanism is moved into a second position, the apertures of the slide mechanism align with the plurality of openings to allow air to flow through the plurality of openings.

In another embodiment, the apparatus further includes a feed roll that attaches toward a first end of the vacuum table, and a take-up roll that attaches toward a second opposing end of the vacuum table.

In another embodiment, the feed roll is configured to store a web of material. The web of material is strung between the feed roll and the take-up roll, and is routed over the vacuum table.

Another embodiment comprises a method, which includes registering a sheet of material on a vacuum table, wherein the vacuum table includes a perimeter vacuum chamber disposed beneath a perimeter of a top surface of the vacuum table, and includes interior vacuum chambers bound by the perimeter vacuum chamber and disposed beneath a central portion of the top surface. The method further includes applying a continuous vacuum to the perimeter vacuum chamber, identifying a target location on the sheet of material for cutting, identifying at least one interior vacuum chamber that corresponds with the target location for cutting, and applying a vacuum to the at least one interior vacuum chamber that corresponds with the target location during cutting of at least one part from the target location. The method further includes removing the vacuum from the at least one interior vacuum chamber that corresponds with the target location after cutting, and removing the at least one part from the vacuum table.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
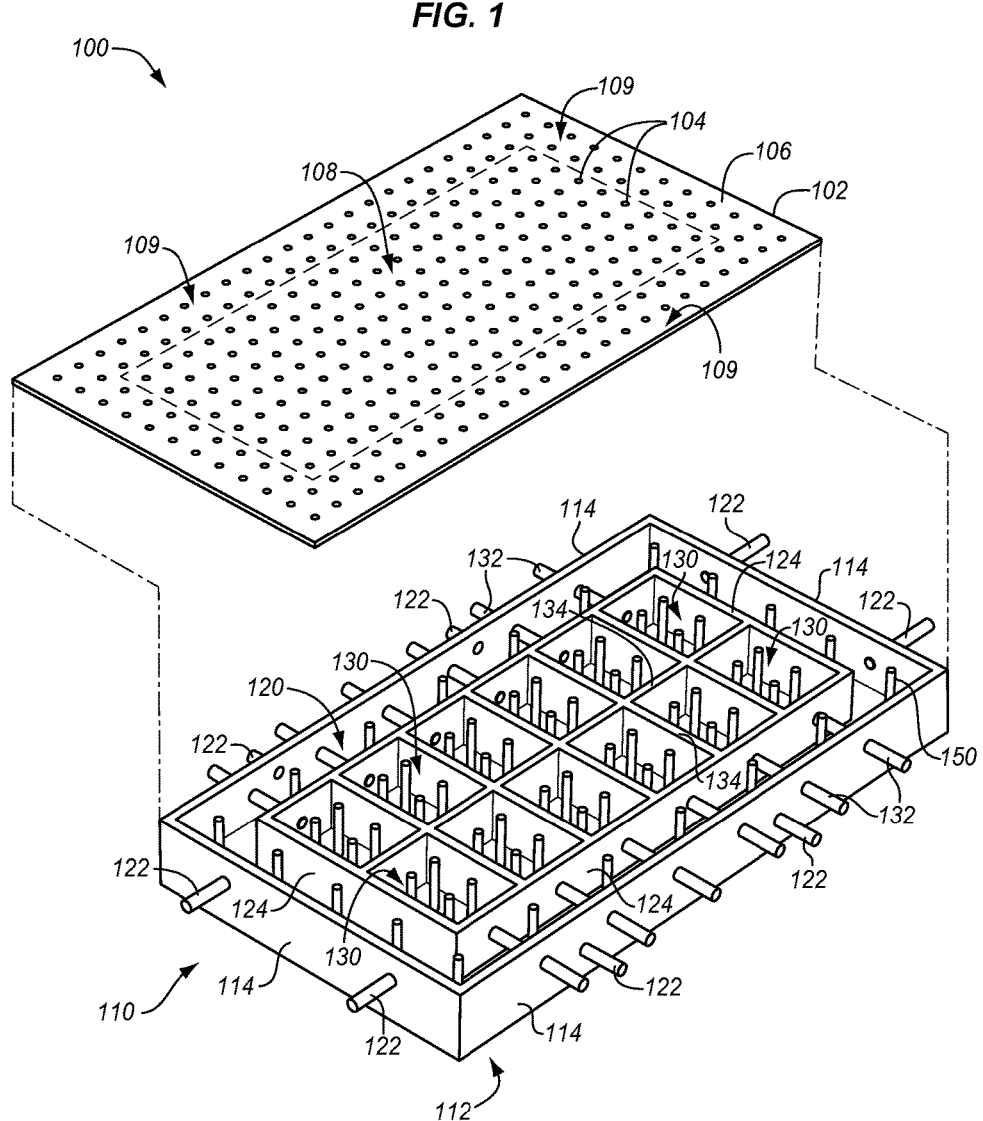
FIG. 1 is an isometric view of a vacuum table in an exemplary embodiment.

FIG. 1 is an isometric view of a vacuum table 100 in an exemplary embodiment. Vacuum table 100 is an apparatus configured to secure a workpiece during manufacturing/machining using suction. For example, vacuum table 100 may be used to secure a thin sheet of a Carbon Fiber Reinforced Polymer (CFRP) or other composite material. Vacuum table 100 is indicated as rectangular in FIG. 1, but may have different shapes in other embodiments. Vacuum table 100 includes a top plate 102 that is porous or perforated. For example, top plate 102 may include voids, pores, or an array of suction holes 104 that traverse through top plate 102. Suction holes 104 allow air to travel through top plate 102 so that a vacuum can be applied to the workpiece. When a vacuum is applied, the workpiece is pulled against top plate 102. The top surface 106 of top plate 102 may be flat or planar to support the workpiece. In other embodiments, the top surface 106 of top plate 102 may be curved. Because top plate 102 is a platform that provides structural support for workpiece, top plate 102 may also be referred to as a table top.

Top plate 102 is configured to connect onto a vacuum box 110, and may be removable. Top plate 102 is separated from vacuum box 110 in FIG. 1 to show the different components within vacuum box 110. Vacuum box 110 comprises the element of vacuum table 100 that applies suction to top plate 102 through suction holes 104. In this embodiment, vacuum box 110 includes a base plate 112 that is formed or attached to side walls 114 to form an air-tight container. Although vacuum box 110 is described as a combination of elements, vacuum box 110 may be a one-piece element that is formed by processes such as 3D printing. In this embodiment, the interior volume of vacuum box 110 is divided or segmented into individual or distinct vacuum chambers that are each configured to apply suction to a designated area of top plate 102. Each vacuum chamber takes the form of a hollow compartment through which air can travel. Each vacuum chamber is separated from one another so that a vacuum may be pulled on one vacuum chamber without affecting other vacuum chambers. As a result, different vacuum chambers may be selectively activated (i.e., under vacuum) at different times.

One of the vacuum chambers is referred to as a boundary or perimeter vacuum chamber 120. Perimeter vacuum chamber 120 is disposed around the outside of vacuum box 110, and therefore, is disposed beneath a perimeter 109 of top plate 102 or a perimeter of a sheet of material that is held on top plate 102. The perimeter 109 of top plate 102 refers to the outer edges or boundaries (i.e., the outside limit of the area of top surface 106) of top plate 102. When vacuum table 100 is used in a manufacturing environment, there is a target area 108 on top surface 106 of top plate 102 that is used for machining. For example, when a workpiece is held on top plate 102, parts may be cut from the workpiece in target area 108, while the outer edges of top plate 102 are used for holding peripheral sections of the workpiece. Perimeter vacuum chamber 120 is therefore disposed beneath the outer edges of top plate 102. The size of perimeter vacuum chamber 120 may vary depending on the size of target area 108.

Perimeter vacuum chamber 120 is formed from chamber walls 124. Chamber walls 124 extend between top plate 102 and base plate 112 at a distance from side walls 114. Thus, there is a gap or spacing between chamber walls 124 and side walls 114 that form perimeter vacuum chamber 120. The size of the spacing between chamber walls 124 and side walls 114 may vary as desired. Perimeter vacuum chamber 120 may include one or more support pins 150 or other support features that extend vertically from base plate 112 to support top plate 102 when suction is applied so that top plate 102 does not bow or deform.

One or more vacuum ports 122 are coupled to perimeter vacuum chamber 120. Vacuum ports 122 are configured to couple perimeter vacuum chamber 120 with one or more vacuum pumps (not shown) via air pathways. The number and locations of vacuum ports 122 may vary as desired. For example, vacuum ports 122 are illustrated as extending from perimeter vacuum chamber 120 through one of side walls 114. In other embodiments, one or more of vacuum ports 122 may extend from perimeter vacuum chamber 120 through base plate 112.

Perimeter vacuum chamber 120 is illustrated as one continuous chamber in FIG. 1. In other embodiments, perimeter vacuum chamber 120 may also be segmented in order to ensure that uniform suction is provided by perimeter vacuum chamber 120 along the perimeter 109 of top plate 102. If segmented, each segment of perimeter vacuum chamber 120 may provide continuous suction to the perimeter 109 of top plate 102.

The other vacuum chambers of vacuum box 110 are referred to as interior vacuum chambers 130. Interior vacuum chambers 130 are bound by perimeter vacuum chamber 120, and are disposed beneath target area 108 of top plate 102 or a sheet of material held on top plate 102. The target area 108 is inside the perimeter 109 of top plate 102, and may be referred to as a central area or central portion of top plate 102. Each interior vacuum chamber 130 comprises its own independent vacuum chamber, which means that each interior vacuum chamber 130 is structurally separated from perimeter vacuum chamber 120 and other interior vacuum chambers 130 to provide suction to a specific region of top plate 102 within target area 108. Interior vacuum chambers 130 are formed from chamber walls 134. Chamber walls 134 extend between top plate 102 and base plate 112, and are illustrated in rows and columns that intersect with each other and chamber walls 124 to form an array of interior vacuum chambers 130. The placement and orientation of chamber walls 134 may vary as desired. For example, chamber walls 134 may have a diagonal pattern or another type of pattern in other embodiments. Interior vacuum chambers 130 may include one or more support pins 150 or other support features that extend vertically from base plate 112 to support top plate 102 when suction is applied so that top plate 102 does not bow or deform.

One or more vacuum ports 132 are coupled to each interior vacuum chamber 130. Each vacuum port 132 is configured to couple an interior vacuum chamber 130 to a vacuum pump (not shown) via an air pathway. The vacuum port 132 for an individual interior vacuum chamber 130 is not shared with other interior vacuum chambers 130 or perimeter vacuum chamber 120. The number and locations of vacuum ports 132 may vary as desired. For example, vacuum ports 132 are illustrated as extending from an interior vacuum chamber 130 through a side wall 114. In other embodiments, one or more of vacuum ports 132 may extend from an interior vacuum chamber 130 through base plate 112. The number and placement of interior vacuum chambers 130 may vary as desired. For example, interior vacuum chambers 130 are shown as an array of chambers aligned in rows and columns. In other embodiments, interior vacuum chambers 130 may be offset from one another or aligned in another pattern as desired.

Figure 2:
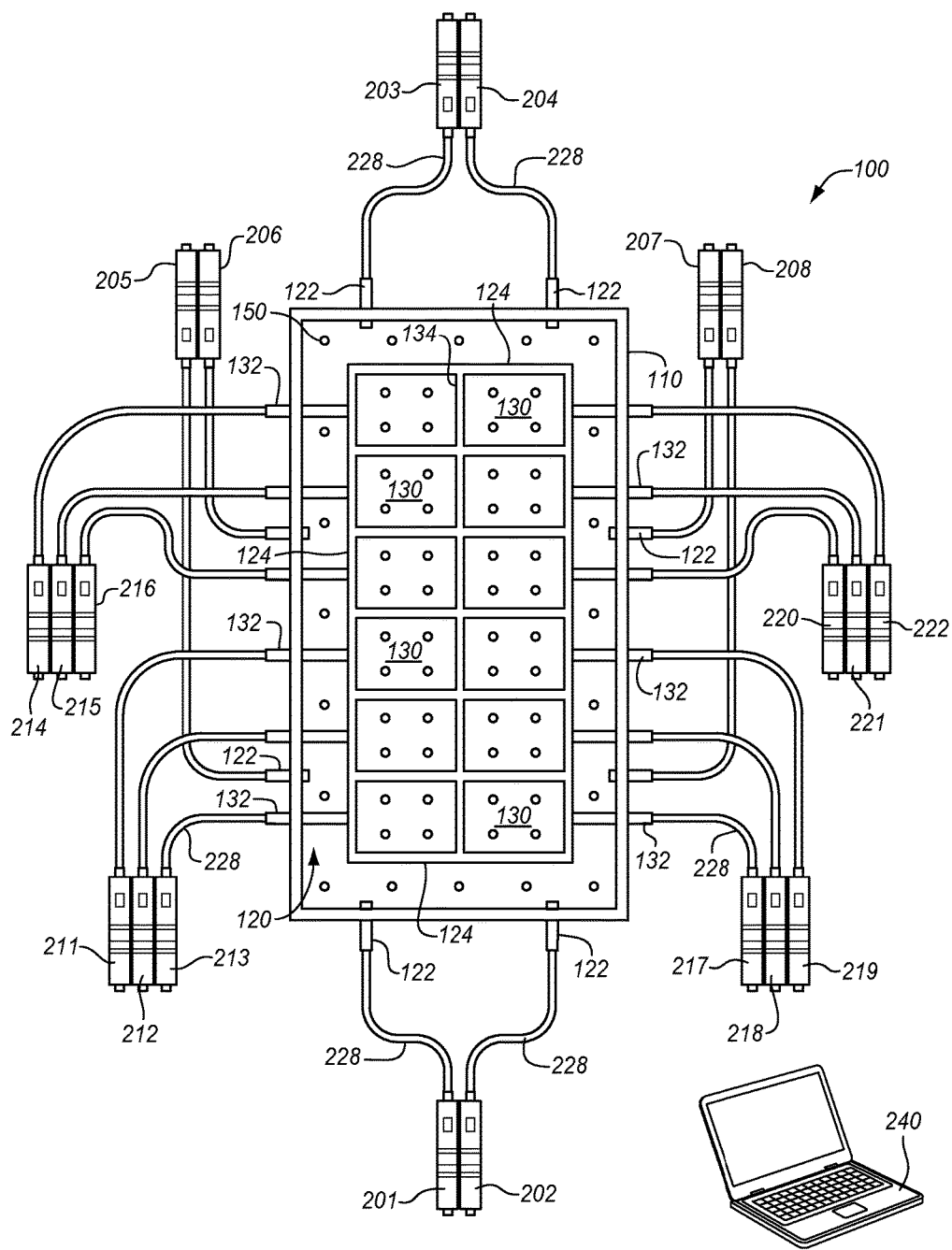
FIG. 2 is a top view of a vacuum table with a top plate removed in an exemplary embodiment.

FIG. 2 is a top view of vacuum table 100 with top plate 102 removed in an exemplary embodiment. In the apparatus shown in this embodiment, perimeter vacuum chamber 120 is connected to vacuum pumps (or vacuum generators) 201-208 through vacuum ports 122 and vacuum lines (hoses) 228. A vacuum pump comprises a device that creates, generates, or applies a partial vacuum or vacuum pressure. The vacuum pumps as described herein may also be used to blow air in addition to creating a vacuum. Interior vacuum chambers 130 are connected to vacuum pumps 211-222, respectively, through vacuum ports 132 and vacuum lines 228. Each vacuum pump 201-208 and 211-222 is individually controllable through a controller 240. Controller 240 is configured to control operation of (i.e., switch on and off) each vacuum pump 201-208 and 211-222 individually. Controller 240 may control operation of vacuum table 100 to apply suction to different areas of top plate 102 (not shown). Controller 240 may communicate with each vacuum pump 201-208 and 211-222 through a wired or wireless connection, or may communicate with an on-board controller on vacuum table 100 to selectively turn vacuum pumps 201-208 and 211-222 on or off, or otherwise control how much suction is applied by each vacuum pump 201-208 and 211-222. Controller 240 comprises a hardware platform that includes a memory, a processor, and a user interface. The memory comprises any device that stores data, such as instructions that are executable by the processor. The processor is a hardware device that comprises logic circuitry for responding to and processing the instructions that drive controller 240. The user interface comprises a device that allows a user to interact with controller 240. The user interface may include an input mechanism, such as a keypad, touch screen, mouse, microphone, etc. The user interface may also include an output mechanism, such as a display, a speaker, etc.

When in operation, controller 240 controls vacuum pumps 201-208 to apply continuous vacuum pressure to perimeter vacuum chamber 120. Thus, any material resting upon top plate 102 over perimeter vacuum chamber 120 will be secured to top plate 102 (see FIG. 1). Controller 240 also controls vacuum pumps 211-222 to selectively apply vacuum pressure to the individual interior vacuum chambers 130. For example, if controller 240 instructs vacuum pump 222 to activate (i.e., turn on), then vacuum pump 222 will apply vacuum pressure to its corresponding interior vacuum chamber 130 (top-right interior vacuum chamber 130 in FIG. 2). If no other vacuum pumps 211-221 are activated, then suction will only be applied by one of the interior vacuum chambers 130. Also, if all vacuum pumps 211-222 are activated, then controller 240 may instruct vacuum pump 222 to deactivate (i.e., turn off). When deactivated, vacuum pump 222 does not apply vacuum pressure to its corresponding interior vacuum chamber 130 (top-right interior vacuum chamber 130 in FIG. 2). Because the interior vacuum chambers 130 are independent from one another, no vacuum pressure is applied to this interior vacuum chamber 130. Thus, a material or piece of material resting on top plate 102 above this interior vacuum chamber 130 may be removed.

Figure 3:
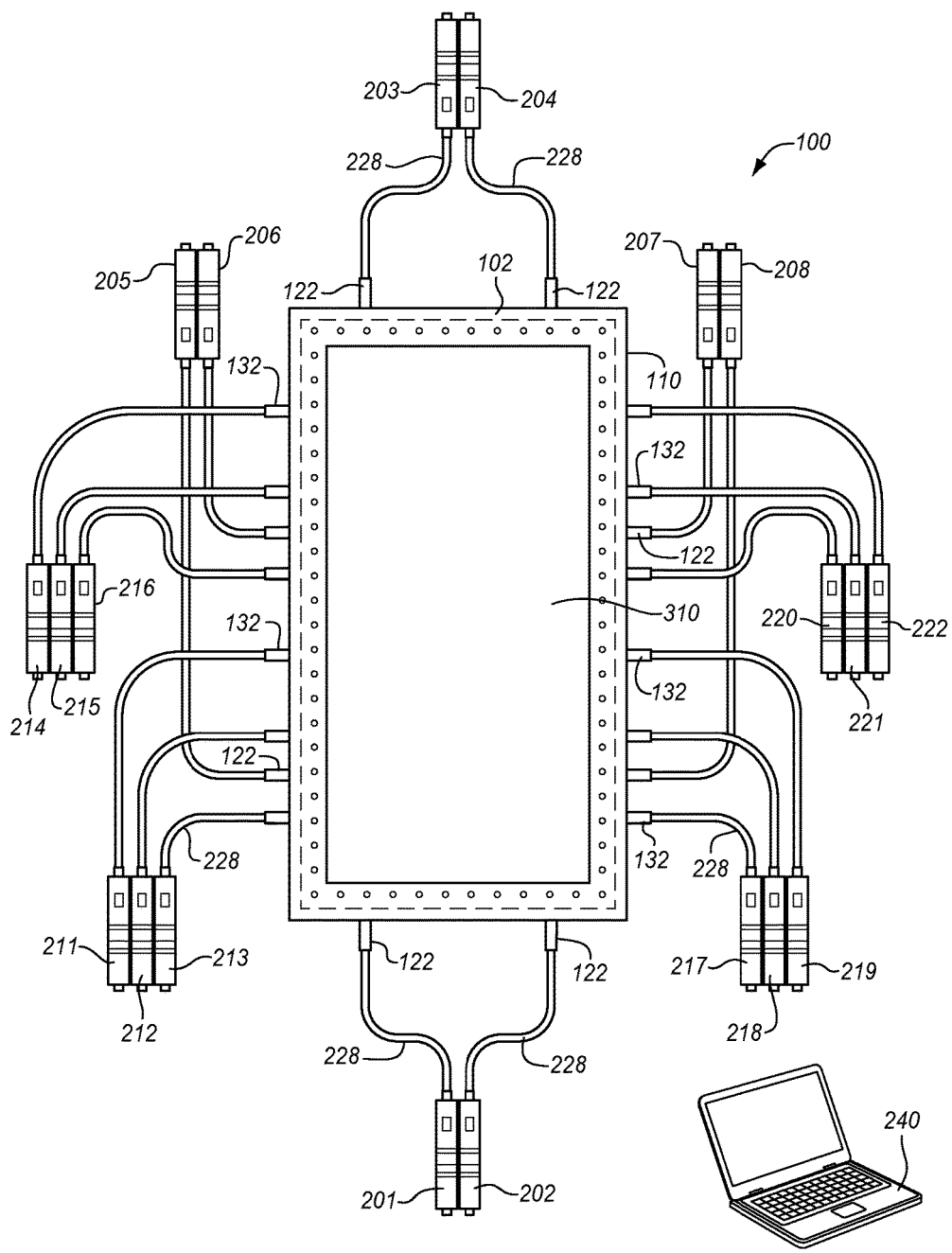
FIGS. 3-6 illustrate top views of a vacuum table with a sheet of material laid on a top plate in an exemplary embodiment.
Figure 4:
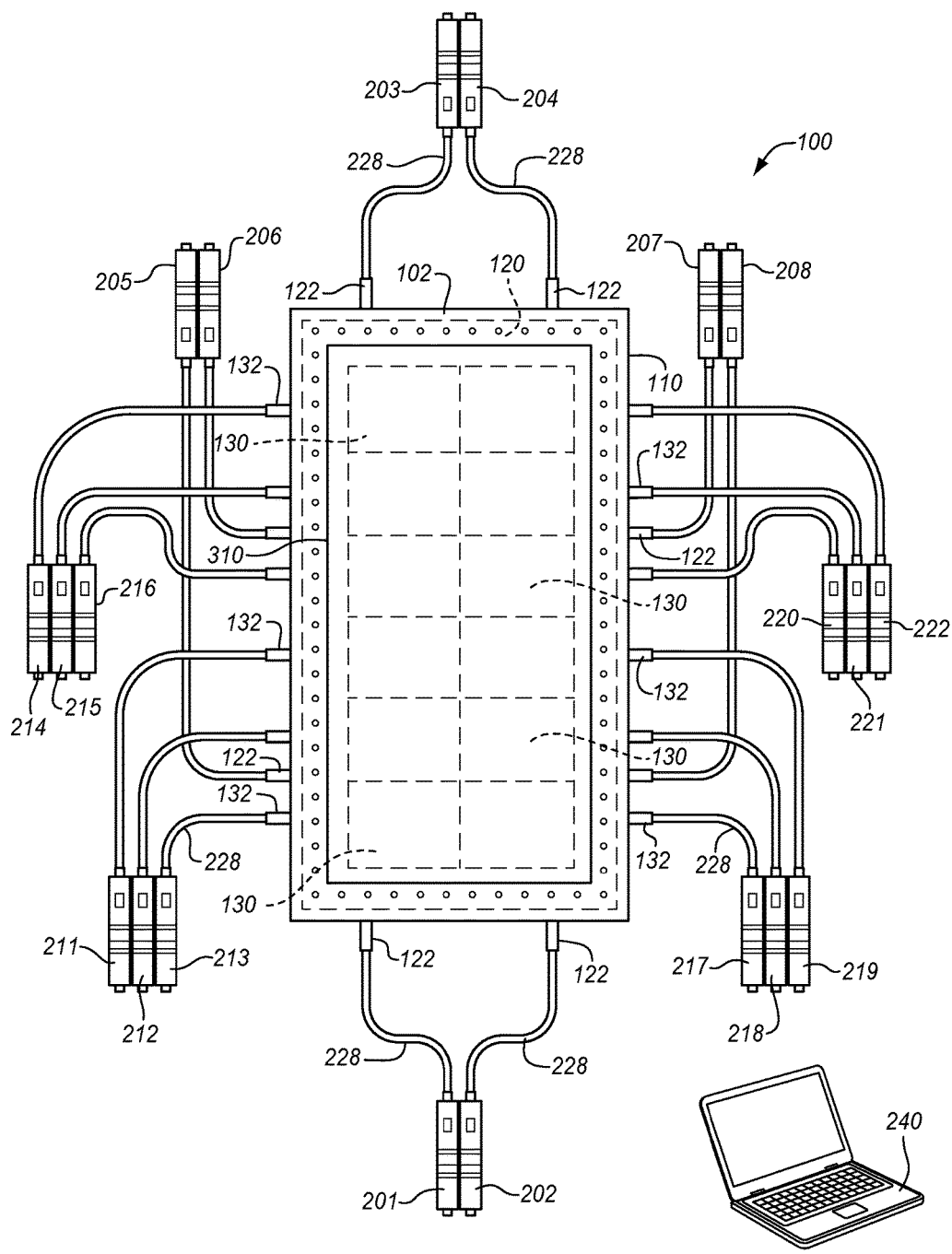
Figure 5:
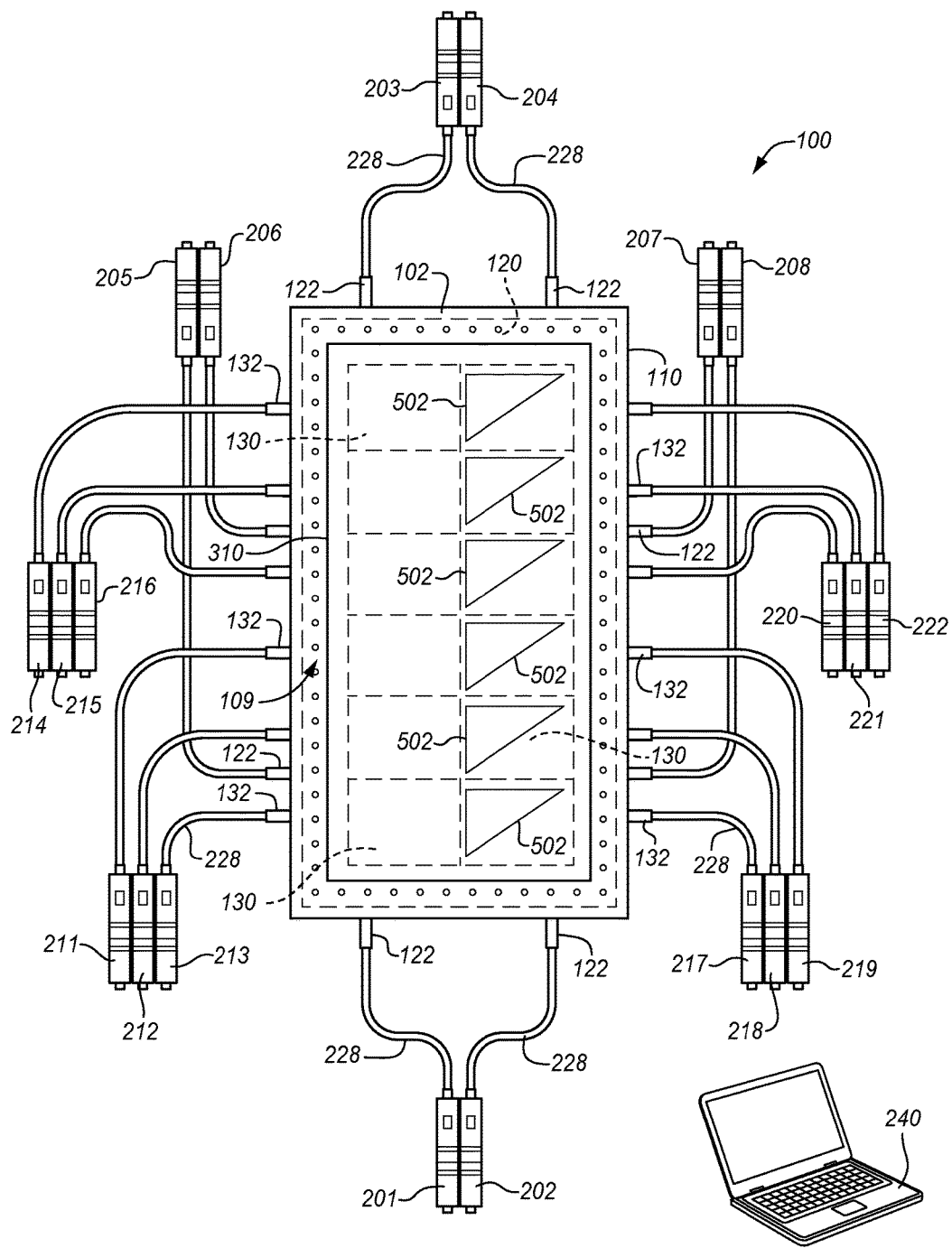
Figure 6:
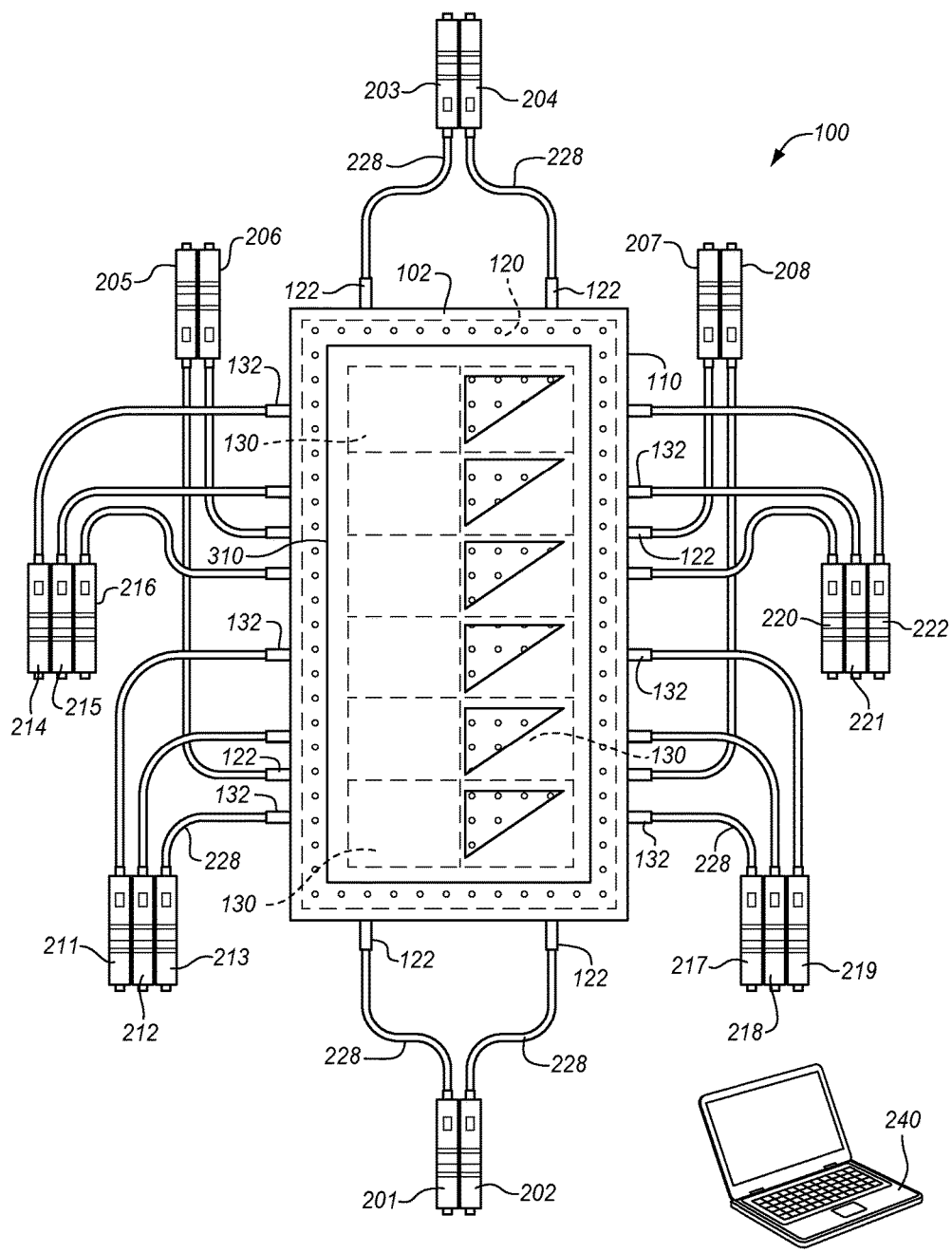

FIGS. 3-6 illustrate top views of vacuum table 100 with a sheet of material 310 laid on top plate 102 in an exemplary embodiment. In FIG. 3, top plate 102 is attached to vacuum box 110, and the sheet of material 310 is laid on top plate 102. One example of the sheet of material 310 is a sheet of a composite material (e.g., CFRP), but other types of material may be used. In FIG. 4, the outlines of perimeter vacuum chamber 120 and interior vacuum chambers 130 are illustrated below the sheet of material 310. As is evident in FIG. 4, perimeter vacuum chamber 120 lies beneath an outer boundary of the sheet of material 310, and is able to provide suction to the outer boundary. Interior vacuum chambers 130 each lie beneath a distinct region or area of the sheet of material 310. Controller 240 is able to selectively control where suction is applied to these distinct regions of the sheet of material 310. In this embodiment, the machining process being used is a cutting process, such as with an ultrasonic knife. In FIG. 5, parts 502 are cut into the sheet of material 310. Controller 240 may activate vacuum pumps 211-222 while the cutting process takes place so that parts 502 are firmly pulled against top plate 102. In FIG. 6, parts 502 are removed from the sheet of material 310, such as by a human operator or a robotic device. To allow parts 502 to be removed, controller 240 may deactivate vacuum pumps 217-222 so that suction is removed from the regions of the sheet of material where parts 502 were cut. With the suction removed, parts 502 are not firmly pulled against top plate 102 and can be removed. At the same time, the rest of the sheet of material 310 is firmly held against top plate 102 by perimeter vacuum chamber 120 and the other interior vacuum chambers 130. This is advantageous in that parts 502 may be cut and removed from certain regions of the sheet of material 310 without having to remove suction from the entire vacuum table 100. Thus, registration of the sheet of material 310 is not lost while parts 502 are removed from vacuum table 100. This speeds up machining processes, reduces the chances of errors, and allows for more efficient use of the sheet of material 310 by reducing waste.

Figure 7:
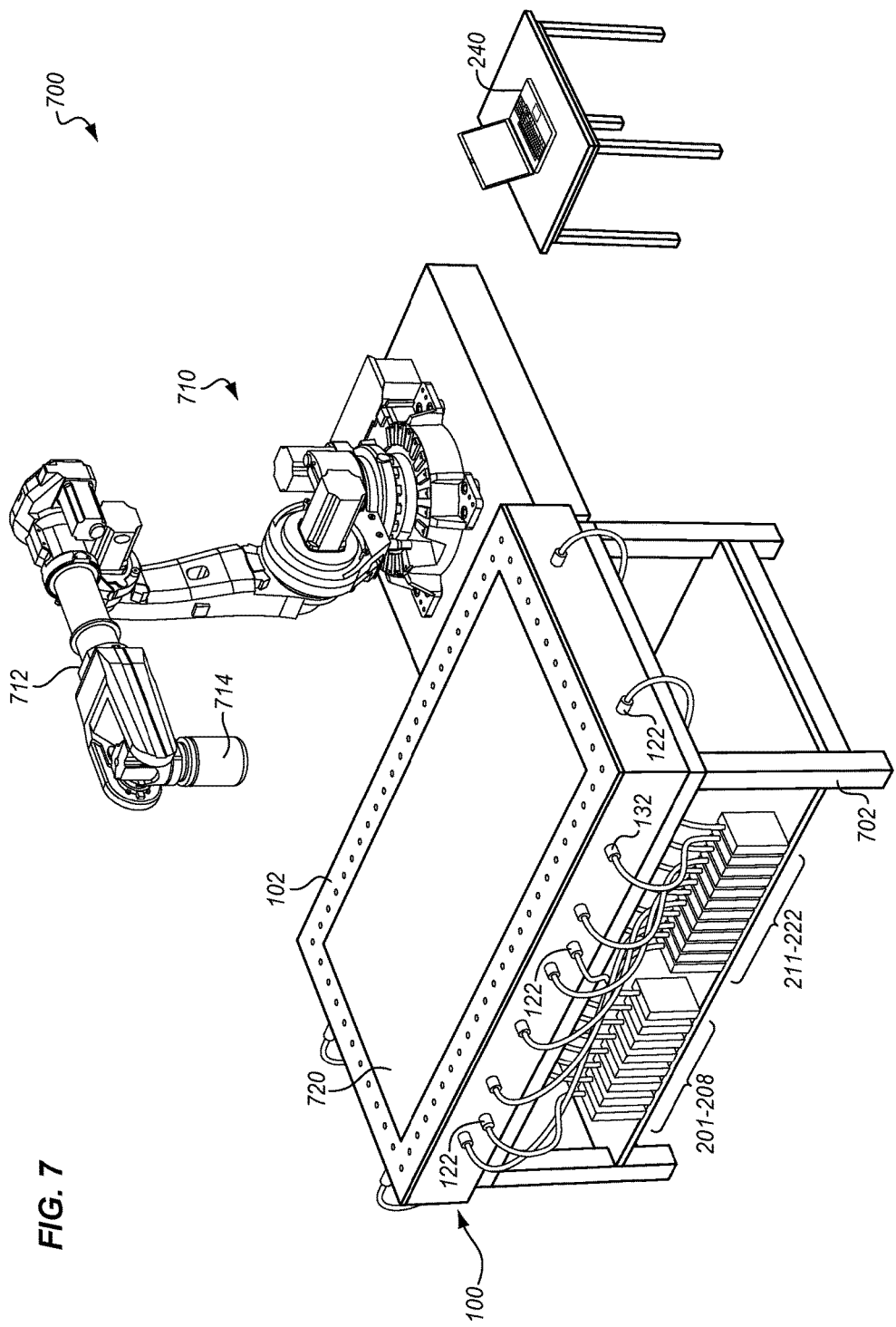
FIG. 7 illustrates a manufacturing environment using a vacuum table in an exemplary embodiment.

FIG. 7 illustrates a manufacturing environment 700 using vacuum table 100 in an exemplary embodiment. In this embodiment, vacuum table 100 is set on a support structure 702. Manufacturing environment 700 also includes a robotic device 710 and controller 240. Controller 240 may control operation of robotic device 710 to perform a variety of functions. Robotic device 710 includes an arm 712 with end effector 714. End effector 714 may be used to transport a sheet of material to vacuum table 100, remove parts from vacuum table 100, and/or remove waste material from vacuum table 100. End effector 714 may be used to cut, engrave, or otherwise machine a sheet of material that is held on vacuum table 100. Controller 240 may communicate with an on-board controller on robotic device 710 through a wired or wireless connection to control operation.

Controller 240 also controls vacuum pumps 201-208 and 211-222 to secure a sheet of material 720 against vacuum table 100. When the sheet of material 720 is loaded onto vacuum table 100, controller 240 controls vacuum pumps 201-208 to apply continuous vacuum pressure to perimeter vacuum chamber 120 (see FIG. 2). Controller 240 also controls vacuum pumps 211-222 to selectively apply vacuum pressure to the individual interior vacuum chambers 130 (see FIG. 2). With the sheet of material 720 firmly secured by vacuum table 100, controller 240 may send instructions to robotic device 710 to perform operations on the sheet of material 720.

Figure 8:
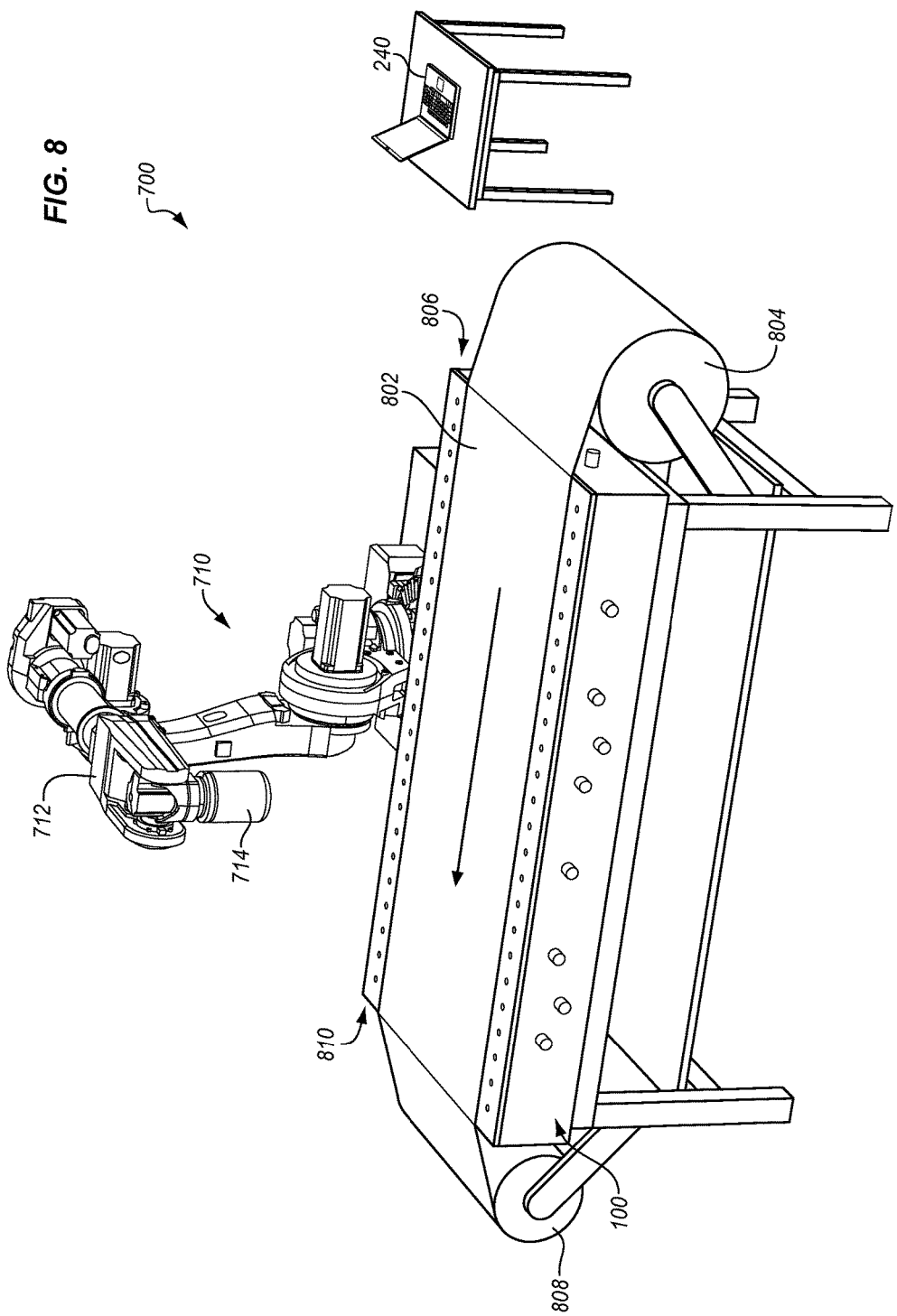
FIG. 8 illustrates a manufacturing environment using a vacuum table in another exemplary embodiment.

FIG. 8 illustrates manufacturing environment 700 in another exemplary embodiment. In the apparatus of this embodiment, a web of material 802 (e.g., a composite material, such as CFRP) is automatically transferred over vacuum table 100. A feed roll 804 attaches toward a first end 806 of vacuum table 100. A take-up roll 808 attaches toward a second opposing end 810 of vacuum table 100. Feed roll 804 stores the web of material 802 that is raw (i.e., unprocessed in manufacturing environment 700). The web of material 802 is strung between feed roll 804 and take-up roll 808, and is routed over vacuum table 100. Take-up roll 808 and/or feed roll 804 may include an actuator (not shown) that is able to turn in response to a control signal from controller 240 to advance the web of material 802 over vacuum table 100 in the direction indicated by the arrow. Feed roll 804 and take-up roll 808 advantageously allow for automatic handling of material without manual positioning. Vacuum table 100 guides the web of material 802 from feed roll 804 to take-up roll 808 while keeping it aligned with robotic device 710. After robotic device 710 cuts parts out of the web of material 802 and removes them from vacuum table 100, the remaining portion of the web of material 802 may be rolled up by take-up roll 808 while bringing fresh material off feed roll 804 onto vacuum table 100.

Figure 9:
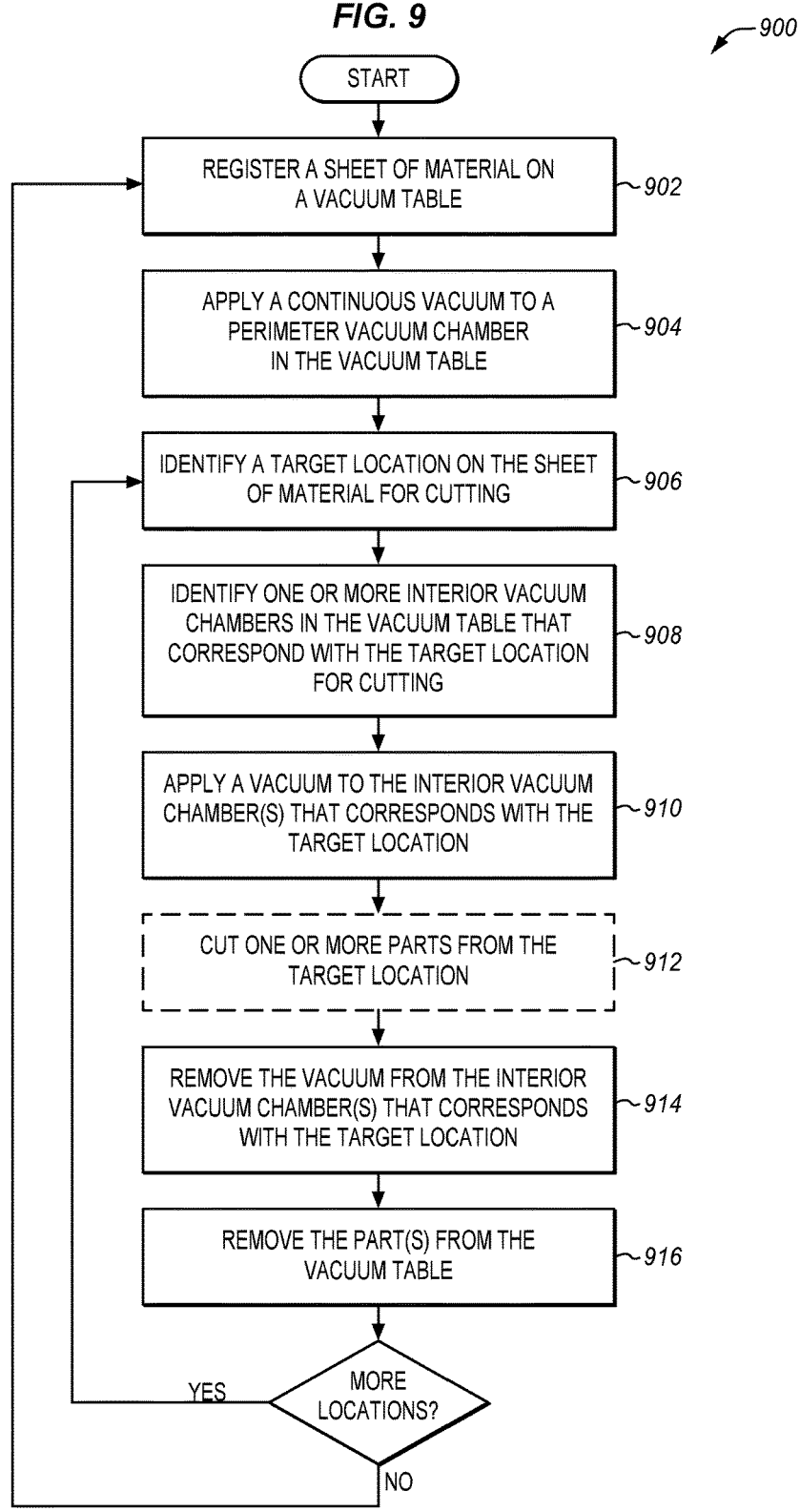
FIG. 9 is a flow chart illustrating a method of using a vacuum table in an exemplary embodiment.

FIG. 9 is a flow chart illustrating a method 900 of using vacuum table 100 in an exemplary embodiment. The steps of method 900 will be described with reference to FIGS. 1-8, but those skilled in the art will appreciate that method 900 may be performed in other manufacturing environments. The steps of this flow chart are not all inclusive and may include other steps not shown, and the steps may be performed in an alternative order.

The steps of method 900 may be performed by a human operator, an automated system (e.g. robotic device 710), or a combination in cutting a part or parts from a sheet (or web) of material. Method 900 includes registering (step 902) the sheet of material on vacuum table 100. For example, a human operator or robotic device 710 may place the sheet of material on vacuum table 100, such as to secure the sheet of material with a desired correspondence with robotic device 710. If the sheet of material is a web as shown in FIG. 8, then step 902 may include advancing the web of material from feed roll 804 to take-up roll 808. To advance the web, controller 240 may instruct an actuator on take-up roll 808 and/or feed roll 804 to turn, which causes the web to advance over vacuum table 100.

Controller 240 controls vacuum pumps 201-208 (see FIG. 2) to apply (step 904) a continuous vacuum to perimeter vacuum chamber 120. Controller 240 identifies (step 906) a target location on the sheet of material for cutting. Controller 240 identifies (step 908) one or more interior vacuum chambers 130 that correspond with the target location for cutting (i.e., located beneath the target location identified for cutting). Controller 240 then selectively activates one or more of vacuum pumps 211-222 (see FIG. 2) to apply (step 910) a vacuum to interior vacuum chamber(s) 130 that correspond with the target location.

At this time, one or more parts are cut from the target location. The cutting may be performed by the human operator, or may be performed by robotic device 710. For the later, controller 240 may optionally control robotic device 710 to cut (step 912) the part(s) from the target location with end effector 714. With the part(s) cut from the target location, the part(s) may be removed from vacuum table 100. Thus, controller 240 deactivates one or more vacuum pumps 211-222 to remove (step 914) the vacuum from interior vacuum chamber(s) 130 that corresponds with the target location. With the vacuum removed from the target location, the part(s) may then be removed (step 916) from vacuum table 100. Removal of the part(s) from vacuum table 100 may be performed by the human operator, or may be performed by robotic device 710. For the later, controller 240 may optionally control robotic device 710 to position end effector 714 over a part, and control one or more vacuum pumps 211-222 to produce a puff of air to transfer the part(s) from vacuum table 100 to end effector 714. With the part(s) secured by end effector 714, controller 240 may control robotic device 710 to move the part(s) to another location.

If there are more locations to cut on the sheet of material, then method 900 repeats at steps 906. If there are no more locations to cut on the sheet of material, then method 900 may repeat at step 902 where a new sheet of material is registered.

Because suction can be selectively applied to vacuum table 100, parts may be cut from some locations on the sheet of material and removed from vacuum table 100. At the same time, the sheet of material is firmly held against vacuum table 100 so that it remains registered with robotic device 710. Thus, additional cuts may be made on the sheet of material at other locations without having to re-register the sheet of material, which speeds up automated cutting processes.

Figure 10:
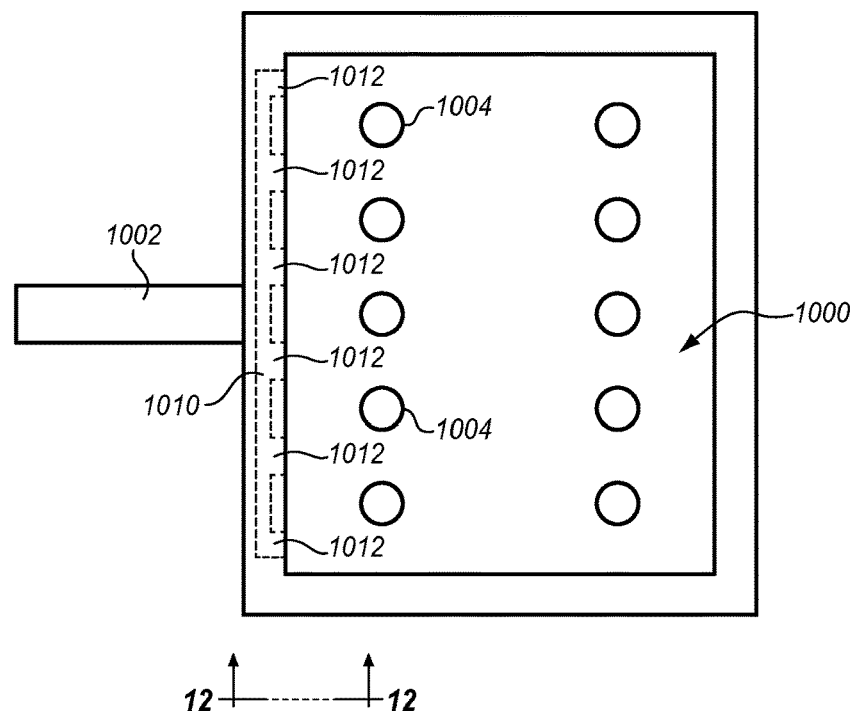
FIGS. 10-11 are top views of an interior vacuum chamber in an exemplary embodiment.
Figure 11:
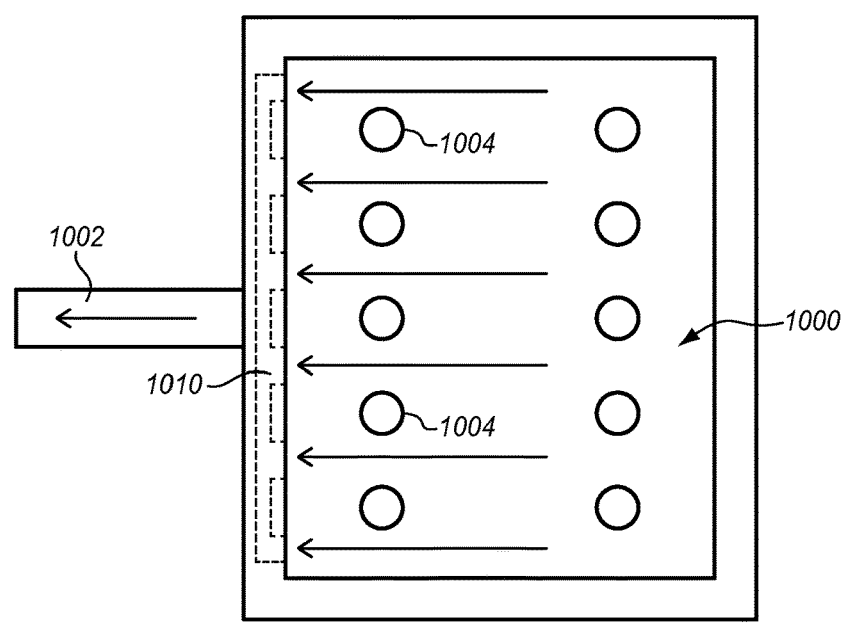

In another embodiment, vacuum ports 132 of interior vacuum chambers 130 and/or vacuum ports 122 of perimeter vacuum chamber 120 may include an elongated vacuum channel to help distribute air flow through interior vacuum chambers 130. FIGS. 10-13 illustrate examples of the elongated vacuum channel. FIGS. 10-11 are top views of a vacuum chamber 1000 in an exemplary embodiment. Vacuum chamber 1000 may represent an interior vacuum chamber 130 or perimeter vacuum chamber 120 as shown in FIG. 1. In FIG. 10, a vacuum port 1002 couples to vacuum chamber 1000 to provide an air pathway to a vacuum pump (not shown). Vacuum chamber 1000 may have features that obstruct air flow when a vacuum is drawn. For example, vacuum chamber 1000 in FIGS. 10-11 includes support pins 1004 that support a top plate, such as top plate 102 (see FIG. 1). In this embodiment, vacuum port 1002 includes an elongated vacuum channel 1010 and a plurality of openings 1012 that extend between vacuum channel 1010 and vacuum chamber 1000. Openings 1012 are spaced along any wall or multiple walls of vacuum chamber 1000. In FIG. 11, when a vacuum is applied to vacuum port 1002, an air flow (illustrated by the arrows) is drawn from vacuum chamber 1000 and through openings 1012 into vacuum channel 1010. Because the air flow is drawn along a length of a wall of vacuum chamber 1000 instead of at a single point, the air flow is more evenly distributed throughout vacuum chamber 1000. Thus, vacuum chamber 1000 advantageously creates a more even vacuum across a corresponding area of a top plate (e.g., top plate 102 in FIG. 1).

Figure 12:
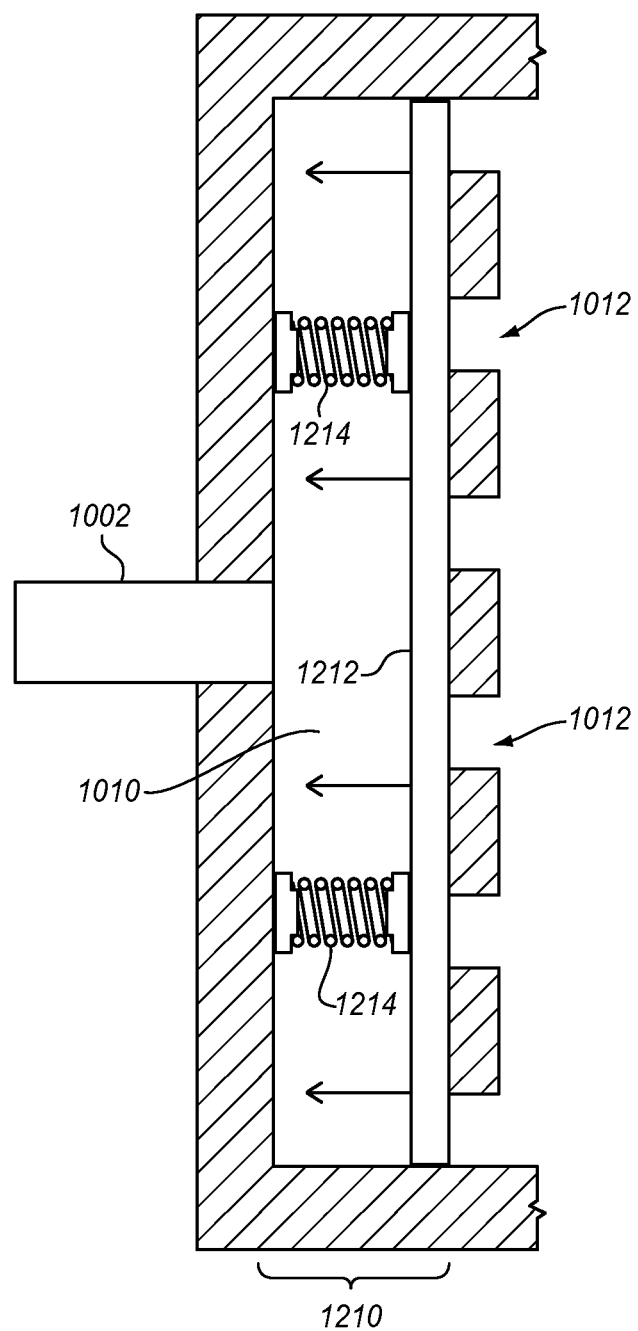
FIG. 12 is a cross-sectional view of a vacuum port in an exemplary embodiment.
Figure 13:
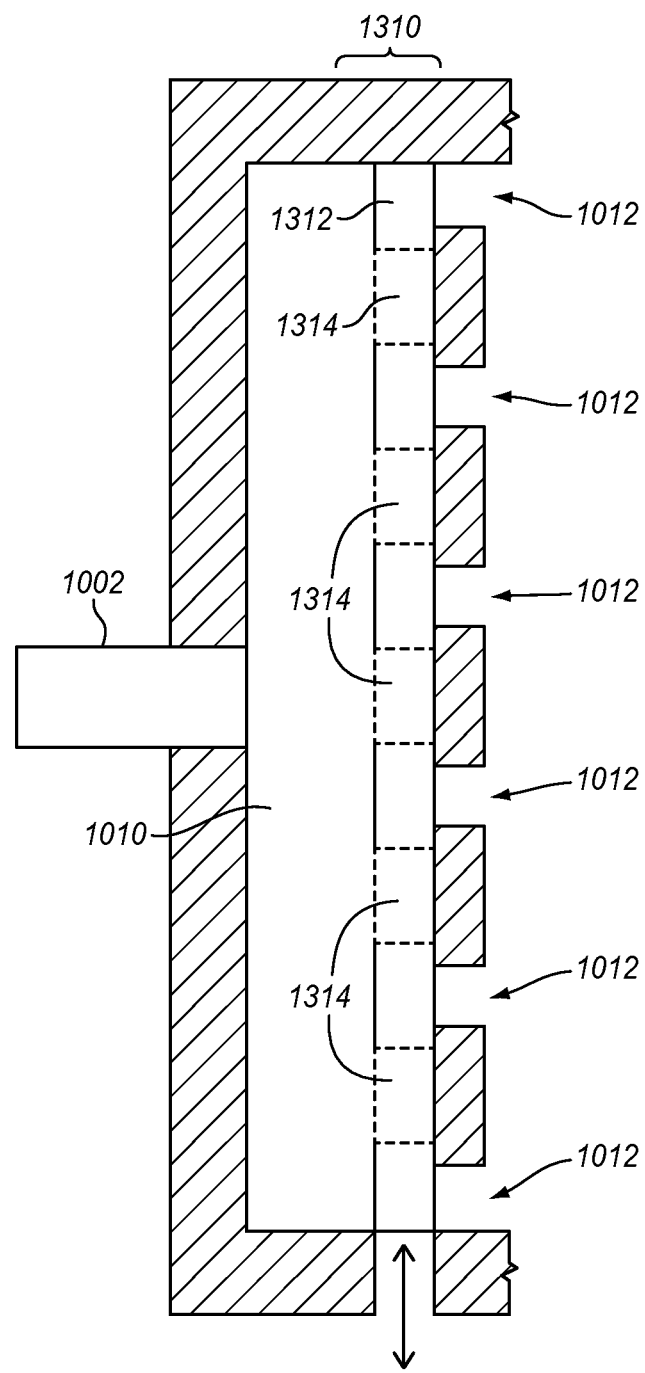
FIG. 13 is a cross-sectional view of a vacuum port in another exemplary embodiment.

It may be desirable to induce the vacuum to vacuum chamber 1000 at a steady initial state. FIGS. 12-13 illustrate mechanism for inducing a steady initial state in exemplary embodiments. FIG. 12 is a cross-sectional view of vacuum port 1002 in an exemplary embodiment. FIG. 12 is a cross-section along line 12-12 of FIG. 10. In this embodiment, vacuum port 1002 further includes a preloaded air valve 1210 that controls air flow through openings 1012 of vacuum port 1002. Air valve 1210 includes a flap 1212 and one or more springs 1214. Springs 1214 are configured to exert a force against flap 1212 to cover openings 1012, which means that air valve 1210 is closed. The amount of force exerted by springs 1214 to preload flap 1212 is a matter of design choice. When flap 1212 covers openings 1012, little or no air flows through openings 1012. As a vacuum is applied to vacuum port 1002 by a vacuum pump (not shown), the vacuum overcomes the force exerted by springs 1214 to open air valve 1210. When air valve 1210 is open, flap 1212 is moved away (to the left in FIG. 12) from openings 1012 and air is able to flow through openings 1012.

FIG. 13 is a cross-sectional view of vacuum port 1002 in another exemplary embodiment. FIG. 13 is a cross-section along line 12-12 of FIG. 10. In this embodiment, vacuum port 1002 further includes an actuated valve 1310 that controls air flow through openings 1012 of vacuum port 1002. Actuated valve 1310 includes a slide mechanism 1312 that includes apertures 1314. The size of apertures 1314 may vary in slide mechanism 1312, or may be the same. Slide mechanism 1312 is configured to slide back and forth across openings 1012 under control of an actuator (not shown). When moved into one position, slide mechanism 1312 is configured to cover openings 1012 and actuated valve 1310 is closed. When moved into another position, apertures 1314 of slide mechanism 1312 align with openings 1012 and air is able to flow through openings 1012. Thus, actuated valve 1310 is open when apertures 1314 of slide mechanism 1312 align with openings 1012.

If air valve 1210 or actuated valve 1310 is used for interior vacuum chambers 130 in FIG. 1, then the valves for each chamber may be set the same in order to allow equal and consistent vacuum at different locations along vacuum table 100. If higher vacuum is desired at some locations, then springs 1214 of air valve 1210 in FIG. 12 could be set at a different spring rate to change the initial flow at that point. Additionally, apertures 1314 in actuated valve 1310 could vary to allow higher flow areas in certain areas of vacuum table 100 if so desired. For example, one aperture 1314 in actuated valve 1310 could be larger than others to allow for higher flow in some areas.

Some of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. An apparatus comprising:
   a vacuum table that includes:
   a top plate that is porous;
   a perimeter vacuum chamber disposed beneath a perimeter of the top plate, and configured to provide a constant vacuum; and
   interior vacuum chambers bound by the perimeter vacuum chamber and each separately enclosed within an inner boundary of the perimeter vacuum chamber to be disposed beneath a target area of the top plate that is inside the perimeter of the top plate;
   wherein the interior vacuum chambers are each selectively controlled to provide a vacuum at different locations on the top plate.

2. The apparatus of claim 1 wherein the vacuum table further includes:
   at least one first vacuum port that couples to the perimeter vacuum chamber; and
   a plurality of second vacuum ports;
   wherein at least one of the second vacuum ports is coupled to a corresponding one of the interior vacuum chambers.

3. The apparatus of claim 2 further comprising:
   a first vacuum pump coupled to the at least one first vacuum port; and
   a controller configured to control the first vacuum pump to apply a constant vacuum to the perimeter vacuum chamber.

4. The apparatus of claim 3 further comprising:
   second vacuum pumps each coupled to a corresponding one of the second vacuum ports;
   wherein the controller is configured to selectively control the second vacuum pumps to apply a vacuum to the interior vacuum chambers individually.

5. The apparatus of claim 2 wherein:
   one of the second vacuum ports includes:
   an elongated vacuum channel; and
   a plurality of openings that extend between the elongated vacuum channel and an interior vacuum chamber;
   wherein the openings are spaced along a wall of the interior vacuum chamber.

6. The apparatus of claim 5 wherein:
   the one of the second vacuum ports includes:
   an air valve that controls air flow through the plurality of openings;
   the air valve includes a flap and at least one spring;
   when the air valve is closed, the at least one spring exerts a force against the flap to cover the plurality of openings;
   to open the air valve, a vacuum applied to the one of the second vacuum ports overcomes the force exerted by the at least one spring to move the flap away from the plurality of openings.

7. The apparatus of claim 5 wherein:
   the one of the second vacuum ports includes:
   an actuated valve that controls air flow through the plurality of openings;
   the actuated valve includes a slide mechanism that includes apertures;
   when the slide mechanism is moved into a first position, the slide mechanism covers the plurality of openings;
   when the slide mechanism is moved into a second position, the apertures of the slide mechanism align with the plurality of openings to allow air to flow through the plurality of openings.

8. The apparatus of claim 7 wherein:
   the apertures in the slide mechanism are different sizes.

9. The apparatus of claim 1 further comprising:
   a feed roll that attaches toward a first end of the vacuum table; and
   a take-up roll that attaches toward a second opposing end of the vacuum table.

10. The apparatus of claim 9 wherein:
    the feed roll is configured to store a web of material; and
    the web of material is strung between the feed roll and the take-up roll, and is routed over the vacuum table.

11. An apparatus comprising:
    a vacuum table that includes:
    a top plate that is porous; and
    a vacuum box that connects with the top plate;
    wherein the vacuum box is segmented to individual vacuum chambers that comprise a perimeter vacuum chamber disposed beneath a perimeter of the top plate, and interior vacuum chambers bound by the perimeter vacuum chamber and disposed beneath a central area of the top plate;
    wherein each of the interior vacuum chambers is structurally separated from the perimeter vacuum chamber and from other ones of the interior vacuum chambers within an inner boundary of the perimeter vacuum chamber;
    wherein the perimeter vacuum chamber is configured to provide a constant vacuum at the perimeter of the top plate;
    wherein the interior vacuum chambers are configured to be selectively activated to provide vacuum at distinct regions of the central area of the top plate.

12. The apparatus of claim 11 wherein the vacuum table further includes:
    at least one first vacuum port that couples to the perimeter vacuum chamber; and
    a plurality of second vacuum ports;
    wherein at least one of the second vacuum ports is coupled to a corresponding one of the interior vacuum chambers.

13. The apparatus of claim 12 further comprising:
    a first vacuum pump coupled to the at least one first vacuum port; and
    a controller configured to control the first vacuum pump to apply a constant vacuum to the perimeter vacuum chamber.

14. The apparatus of claim 13 further comprising:
    second vacuum pumps each coupled to a corresponding one of the second vacuum ports;
    wherein the controller is configured to selectively control the second vacuum pumps to apply a vacuum to the interior vacuum chambers individually.

15. The apparatus of claim 12 wherein:
    one of the second vacuum ports includes:
    an elongated vacuum channel; and a plurality of openings that extend between the elongated vacuum channel and an interior vacuum chamber;

wherein the openings are spaced along a wall of the interior vacuum chamber.

16. The apparatus of claim 15 wherein:

the one of the second vacuum ports includes:

an air valve that controls air flow through the plurality of openings;

the air valve includes a flap and at least one spring;

when the air valve is closed, the at least one spring exerts a force against the flap to cover the plurality of openings;

to open the air valve, a vacuum applied to the one of the second vacuum ports overcomes the force exerted by the at least one spring to move the flap away from the plurality of openings.

17. The apparatus of claim 15 wherein:

the one of the second vacuum ports includes:

an actuated valve that controls air flow through the plurality of openings;

the actuated valve includes a slide mechanism that includes apertures;

when the slide mechanism is moved into a first position, the slide mechanism covers the plurality of openings;

when the slide mechanism is moved into a second position, the apertures of the slide mechanism align with the plurality of openings to allow air to flow through the plurality of openings.

18. The apparatus of claim 11 further comprising:

a feed roll that attaches toward a first end of the vacuum table; and a take-up roll that attaches toward a second opposing end of the vacuum table.

19. The apparatus of claim 18 wherein:

the feed roll is configured to store a web of material; and the web of material is strung between the feed roll and the take-up roll, and is routed over the vacuum table.

\* \* \* \* \*